Oct. 17, 1961 T. E. LOHR 3,004,757
POWER-ACTUATED TAIL GATE
Filed July 8, 1960 3 Sheets-Sheet 1

INVENTOR.
Thomas E. Lohr
BY
R. P. Barnard
ATTORNEY

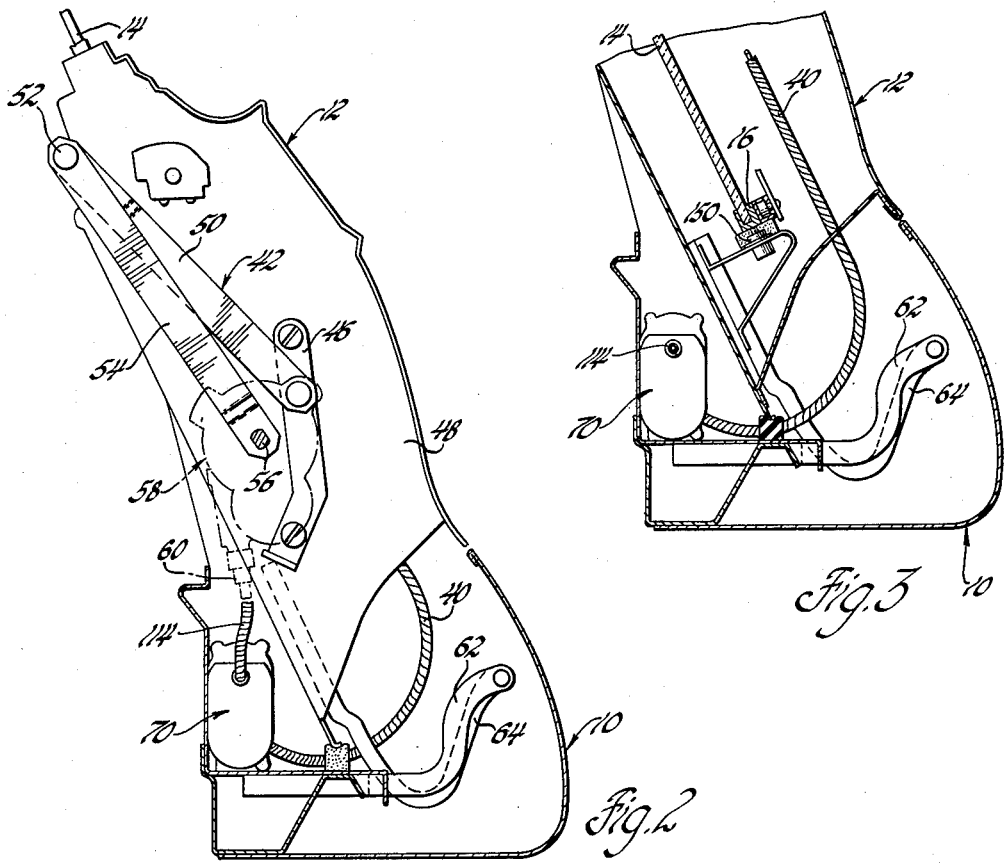
Fig. 2
Fig. 3
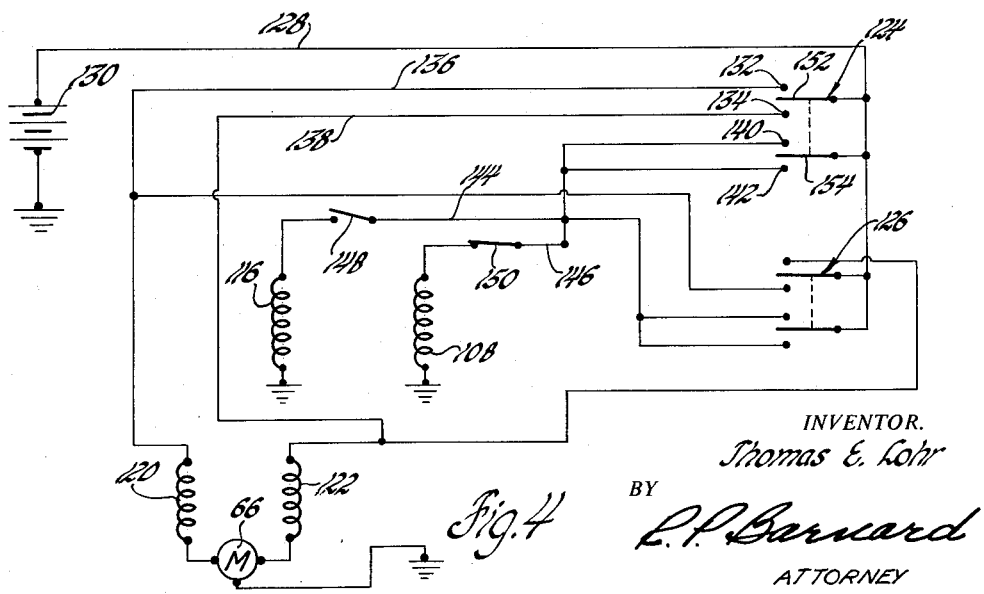
Fig. 4
INVENTOR.
Thomas E. Lohr
BY
C. P. Barnard
ATTORNEY INVENTOR.
Thomas E. Lohr
BY
C.P. Barnard
ATTORNEY

United States Patent Office 3,004,757
Patented Oct. 17, 1961

3,004,757
POWER-ACTUATED TAIL GATE
Thomas E. Lohr, Detroit, Mich., assignor to General Motors Corporation, Detroit, Mich., a corporation of Delaware
Filed July 8, 1960, Ser. No. 41,549
6 Claims. (Cl. 268—74)

The present invention relates to a power-actuated tail gate mechanism for a vehicle. More specifically, the present invention is of the type in which the tail gate includes a retractable or roll-down window which, when in its up or extended position, coacts with the tail gate to close the rear opening of a station wagon type vehicle.

It is common current practice to provide a power-actuated mechanism for actuating the roll-down window of a tail gate. However, it is the object of the present invention to combine such a power-actuated tail gate window with a mechanism which is also adapted to power-actuate the tail gate itself. In other words, with a single motor, the present invention makes it possible to both actuate the tail gate window and pivotally operate the tail gate.

In the present invention, a motor is adapted to be mounted within the vehicle body and to provide the power input to a multi-output transmission mechanism also disposed within the vehicle body. The transmission mechanism includes a plurality of clutch controlled output shafts adapted to be selectively coupled to and drive the window roll-down mechanism and also to the tail gate lever operating mechanism. The subject power mechanism is so arranged that the window and tail gate actuation occur sequentially and the motor is never required to drive both at the same time. To illustrate, the vehicle operator may operate a single dash mounted switch and, assuming the tail gate and window to be in their closed positions, cause the window to be rolled down within the tail gate to its fully retracted position at which time the power to the window operating mechanism is interrupted. At the same time power is transmitted to the tail gate operating levers to actuate the same and move the tail gate to its lowered position. Correspondingly, in raising the tail gate, the operator operates a single switch which causes the tail gate to be first rotated to a closed position after which the tail gate window is raised to its closed position.

The details as well as other objects and advantages of the present invention will be apparent from a perusal of the detailed description which follows.

Figure 1:
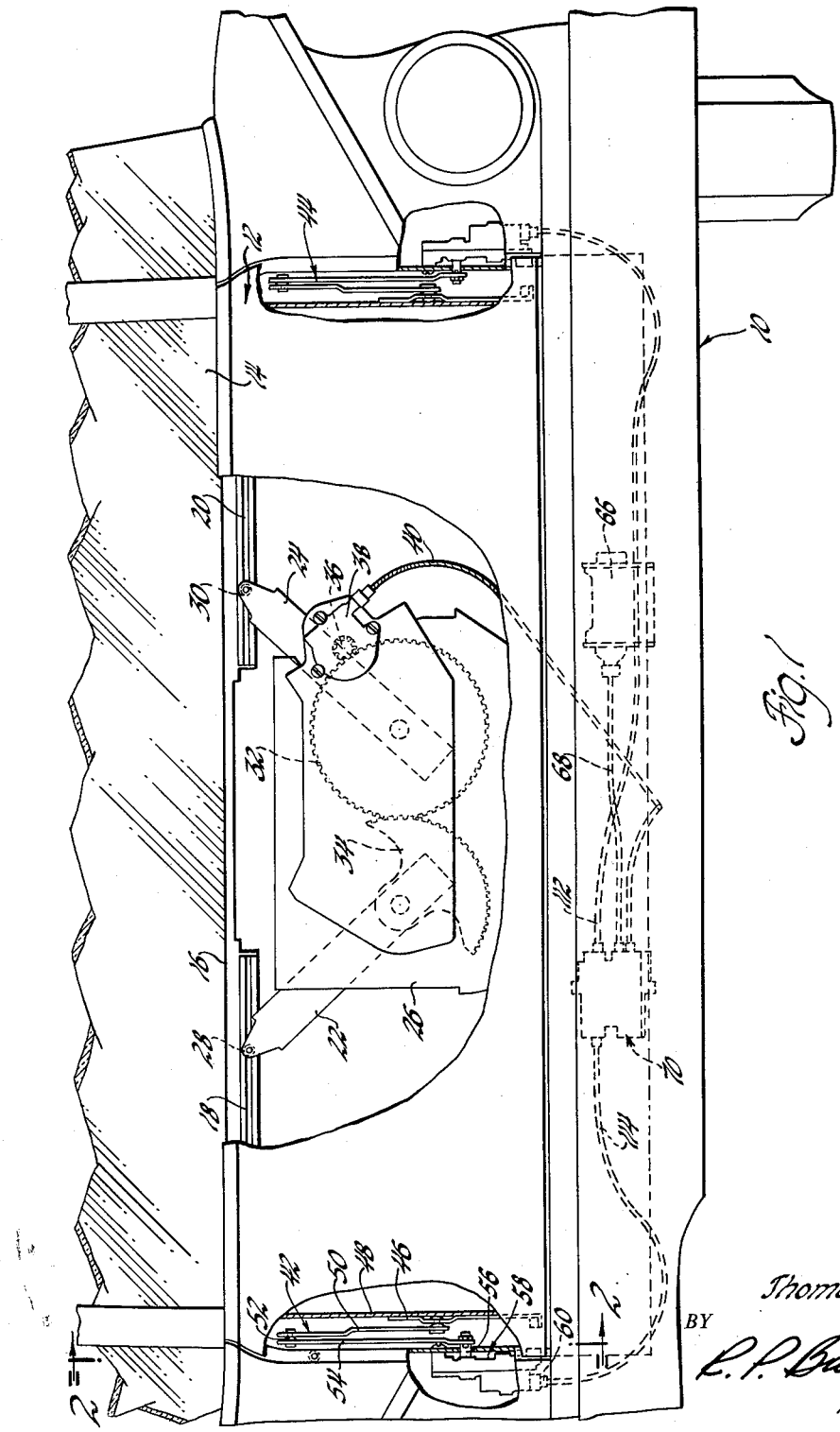
Figure 5:
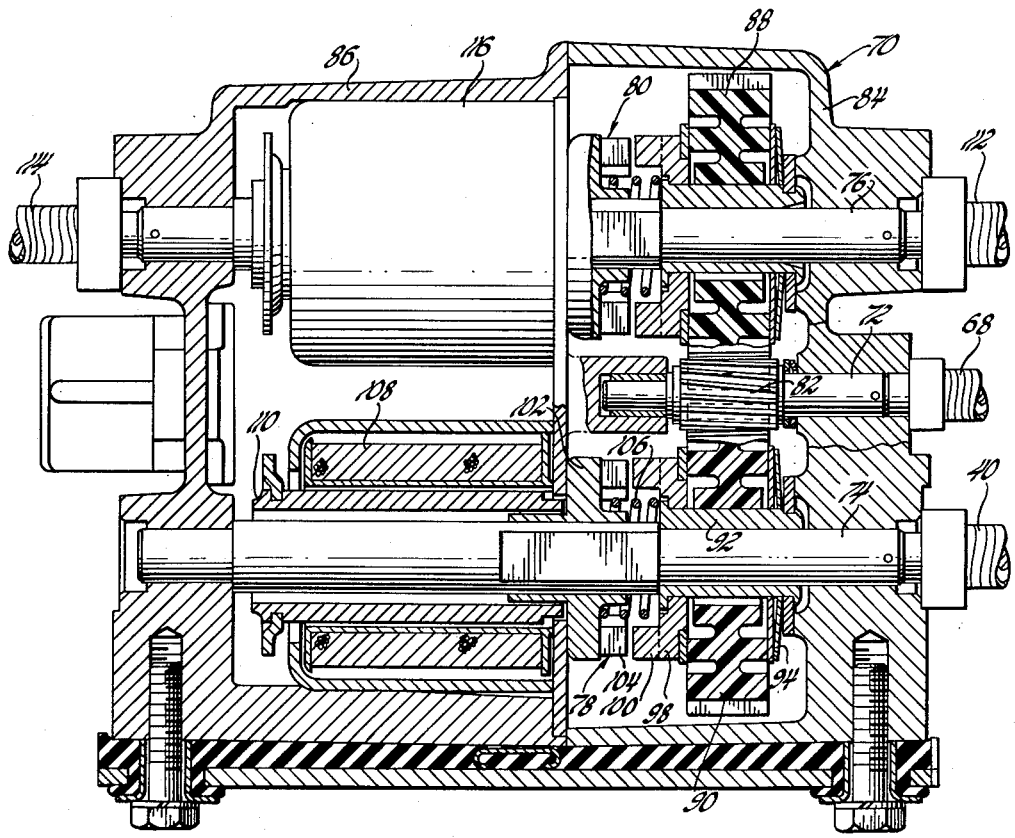

In the drawings:
FIGURE 1 is a view of the rear end of a station wagon type vehicle embodying the present invention;
FIGURE 2 is a view along line 2—2 of FIGURE 1;
FIGURE 3 is a side elevational view of the lower portion of the tail gate showing the tail gate window in its retracted position;
FIGURE 4 is a diagrammatic representation of the electrical control circuit for the tail gate operating mechanism; and
FIGURE 5 is a sectional view of a power transmission device.

Referring to FIGURE 1, a vehicle is indicated generally at 10 and includes a tail gate 12 and a window 14 retractably mounted therein. Tail gate window 14 includes a frame member 16 to the lower edge of which are secured a pair of slotted tracks 18 and 20. Control arms 22 and 24 are suitably pivoted to a supporting bracket 26 disposed within the tail gate member and include free ends having rollers 28 and 30 disposed within slotted tracks 18 and 20. A gear member 32 is fixed to control arm 24 and meshes with a similar gear segment 34 fixed to operating arm 22. A small pinion gear 36 meshes with gear 32 and is adapted to be driven by gear device 38 which in turn is actuated through a flexible power shaft 40. Thus window 14 may be moved from its raised position, as shown in FIGURE 1, to its lowered position by rotating pinion 36 in a counterclockwise direction which respectively imparts, through gear members 32 and 34, clockwise and counterclockwise rotations to operating levers 24 and 22 thereby moving the window downwardly within tail gate 12.

Inasmuch as the tail gate controlling devices, indicated generally at 42 and 44, are identical it will only be necessary to describe the construction and operation of one of these devices. Lever device 42 includes a bracket 46 fixed to the side wall 48 of the tail gate and has one end of a lever 50 pivotally connected thereto. The other end of lever 50 is articulated at 52 to a driving lever 54. The other end of lever 54 is fixed to output shaft 56 of a gear reduction device 58. For present purposes it will suffice to say that the gear reduction device includes a power input shaft 60 and power output shaft 56. Thus as power output shaft 56 is rotated in a clockwise direction, as seen in FIGURE 2, lever 54 will be similarly rotated causing lever 50 to move tail gate 12 in a counterclockwise direction whereby the tail gate, pivotally connected to the vehicle body through straps 62 and 64, will be opened.

In order to provide the power for actuating window 14 and tail gate 12, a motor 66 is supported within the vehicle body adjacent the lower edge of the tail gate. A flexible drive shaft 68 interconnects motor 66 and a transmission mechanism 70 and provides the power input thereto. Transmission mechanism 70 is shown and described in detail in copending application Serial No. 41,520, Lohr, filed July 8, 1960.

Transmission mechanism 70 is an important element of the subject combination and provides a means whereby a single power input shaft 72 may drive a plurality of output shafts 74 and 76 and which output shafts may be selectively coupled to the input shaft through solenoid controlled clutches 78 and 80.

Referring to FIGURE 5, flexible input shaft 68 is coupled to input shaft 72 which has a small pinion gear 82 fixed thereto. Power output shafts 74 and 76 are rotatably supported within casings 84 and 86 on axes parallel to the axis of input shaft 72. A pair of gear members 88 and 90 are respectively loosely mounted on output shafts 74 and 76 and are adapted to mesh with and be driven by input shaft pinion gear 82. Inasmuch as the construction of each output shaft driving mechanism is identical, a description of one of these devices will suffice. A sleeve member 92 is rotatably mounted relative to output shaft 74 and coupled to gear 90 through a Belleville washer type friction clutch 94. Under normal torque loads, gear 90 will rotatably drive sleeve 92.

Clutch device 78 is adapted to couple sleeve 92 to output shaft 74. Clutch 78 includes a first member 98 fixed to sleeve 92 and having a pair of axially extending dog teeth 100. A corresponding member 102 is fixed to output shaft 74 and includes dog teeth 104 adapted to mesh with teeth 100 of member 98. A spring member 106 is disposed between members 98 and 102 and normally biases the latter member axially out of engagement with the former. A solenoid 108 is mounted within casing 86 and axially receives an armature 110 fixed to slidable clutch member 102. Thus when solenoid 108 is energized, armature 110 is adapted to be moved upwardly, as viewed in FIGURE 5, to engage clutch members 98 and 102 whereby output shaft 74 will be drivingly coupled to input shaft 72. In the event the torque load on shaft 74 becomes excessive, Belleville washer clutch 94 will slip preventing damage to the mechanism.

Output shafts 74 and 76 extend through casings 84 and 86 and may be coupled with a suitable output drive shaft at either end. As seen in FIGURE 1, the ends of output shaft 76 are coupled to flexible drive shafts 112 and 114 leading to the gear reduction devices adapated to drive the tail gate operating devices 42 and 44. The window operating mechanism flexible shaft 40 is connected to transmission output shaft 76. Thus by selectively energizing solenoids 108 or 116 either window 14 or tail gate 12 may be operated.

Referring now to the control circuit of FIGURE 4, motor 66 includes a pair of windings 120 and 122 enabling the motor to be driven in either direction. Master switches 124 and 126 are respectively positioned on the vehicle dash and any other convenient place on the vehicle such as adjacent the tail gate whereby the tail gate mechanism may be operated from a plurality of stations. Switches 124 and 126 are of the multiple double-throw type. Lead 128 connects the parallel related switches 124 and 126 with a power source such as the engine battery 130. Inasmuch as switches 124 and 126 are identical and are adapted to perform identical functions, it will be necessary to describe only one.

Terminals 132 and 134 of switch 124 connect through leads 136 and 138 to the respective motor windings 120 and 122. The second set of terminals 140 and 142 of the switch connect through leads 144 and 146 with the parallel connected solenoids 108 and 116. Limit switches 148 and 150 are respectively provided in leads 144 and 146 to insure that either the window solenoid 108 or the tail gate solenoid 116 will be energized.

Assuming the tale gate and window to be in the position shown in FIGURES 1 and 2, tail gate solenoid limit switch 148 will be open and window solenoid limit switch 150 closed as indicated in FIGURE 4. If switch 124 is now moved to cause movable contacts 152 and 154 to respectively engage terminals 132 and 140, field 120 will be energized to rotate the motor. At the same time, window solenoid 108 will be energized coupling the motor to the window lowering mechanism whereby the window will be lowered until it is fully retracted within tail gate 12. When window 14 is fully retracted, limit switch 150 is opened causing clutch 78 to uncouple the window operating mechanism from motor 66. At this point, and as seen in FIGURE 3, limit switch 150 is closed coupling motor 66 to the tail gate operating devices 42–44 whereby the tail gate will now be lowered. To close the tail gate opening, the process is reversed so that tail gate 12 will first be moved to its closed position followed by a raising of window 14.

I claim:

1. A vehicle tail gate operating mechanism of the type having a tail gate pivotal about a horizontal axis to permit access to the rear end of the vehicle body and further having a slidable window retractable within the tail gate, in which a gear and lever mechanism is disposed within said tail gate for raising and lowering said window, a pair of lever devices connected to the sides of said tail gate and to the vehicle body, said lever devices being operable to move the tail gate between open and closed positions, gear reduction devices respectively connected to said lever devices, a transmission device, said transmission device including a plurality of output shafts and a single input shaft, a motor, drive means interconnecting said motor and said transmission input shaft, a pair of flexible drive shafts coupled to one of said transmission output shafts and respectively drivingly connected to said gear reduction devices, a flexible drive shaft connected to another of said transmission output shafts and drivingly connected to said window gear and lever mechanism, and a clutch device associated with each transmission output shaft and disconnectibly coupling said shaft and said transmission input shaft.

2. A vehicle tail gate operating mechanism of the type having a tail gate pivotal about a horizontal axis to permit access to the rear end of the vehicle and further having a slidable window retractable within the tail gate, in which a gear and lever mechanism is disposed within said tail gate for raising and lowering said window, a pair of lever devices connected to the sides of said tail gate and to the vehicle body, said lever devices being operable to move the tail gate between open and closed positions, gear reduction devices respectively connected to said lever devices, a transmission device, said transmission device including a plurality of output shafts and a single input shaft, a motor, drive means interconnecting said motor and said transmission input shaft, a pair of flexible drive shafts coupled to one of said transmission output shafts and respectively drivingly connected to said gear reduction devices, a flexible drive shaft connected to another of said transmission output shafts and drivingly connected to said window gear and lever mechanism, a clutch device associated with each transmission output shaft and disconnectibly coupling said shaft and said transmission input shaft, and means for insuring that only one of said transmission output shafts is coupled to said input shaft at the same time.

3. A vehicle tail gate operating mechanism of the type having a tail gate pivotal about a horizontal axis to permit access to the rear end of the vehicle and further having a slidable window retractable within the tail gate, in which a gear and lever mechanism is disposed within said tail gate for raising and lowering said window, a pair of lever devices connected to the sides of said tail gate and to the vehicle body, said lever devices being operable to move the tail gate between open and closed positions, gear reduction devices respectively connected to said lever devices, a transmission device, said transmission device including a plurality of output shafts and a single input shaft, a motor, drive means interconnecting said motor and said transmission input shaft, a pair of flexible drive shafts coupled to one of said transmission output shafts and respectively drivingly connected to said gear reduction devices, a flexible drive shaft connected to another of said transmission output shafts and drivingly connected to said window gear and lever mechanism, a solenoid controlled clutch device associated with each transmission output shaft and disconnectibly coupling said shaft and said transmission input shaft, and an electrical control circuit for said motor and clutches.

4. A vehicle tail gate operating mechanism as set forth in claim 1 in which each transmission output shaft includes a second clutch device adapted to interrupt drive between said shaft and the input shaft when the output shaft torque load exceeds a predetermined value.

5. A vehicle tail gate operating mechanism as set forth in claim 3 in which each transmission output shaft includes a friction clutch which will slip to interrupt drive when output shaft torque exceeds a predetermined value.

6. A vehicle tail gate operating mechanism as set forth in claim 3 in which said electrical control circuit includes limit switches respectively controlled by the window and the tail gate to insure that only one transmission output shaft is coupled to the input shaft at the same time.

References Cited in the file of this patent

UNITED STATES PATENTS

| | | |
|---|---|---|
| 2,793,907 | Hess et al. | May 28, 1957 |
| 2,893,727 | Barnard | July 7, 1959 |